US010313008B2

(12) United States Patent
Chen et al.

(10) Patent No.: US 10,313,008 B2
(45) Date of Patent: Jun. 4, 2019

(54) MEASUREMENT METHOD AND APPARATUS FOR RESIDUAL DIRECT-CURRENT COMPONENTS AND A SYSTEM

(71) Applicant: Fujitsu Limited, Kawasaki-shi, Kanagawa (JP)

(72) Inventors: Hao Chen, Beijing (CN); Zhenning Tao, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 58 days.

(21) Appl. No.: 15/664,105

(22) Filed: Jul. 31, 2017

(65) Prior Publication Data

US 2018/0076888 A1 Mar. 15, 2018

(30) Foreign Application Priority Data

Sep. 13, 2016 (CN) .......................... 2016 1 0822223

(51) Int. Cl.
 *H04B 17/13* (2015.01)
 *H04B 10/079* (2013.01)
 *H04B 10/61* (2013.01)

(52) U.S. Cl.
 CPC ..... *H04B 10/07955* (2013.01); *H04B 10/614* (2013.01); *H04B 10/616* (2013.01)

(58) Field of Classification Search
 CPC ............ H04B 10/07955; H04B 10/614; H04B 10/616
 USPC ........................................................ 398/38
 See application file for complete search history.

(56) References Cited

U.S. PATENT DOCUMENTS

| 5,583,597 A | 12/1996 | Enomoto |
| 9,059,805 B2* | 6/2015 | Mak ................... H04B 10/5055 |
| 2002/0158871 A1 | 10/2002 | Evankow, Jr. et al. |
| 2007/0177876 A1* | 8/2007 | Ooi ...................... G01M 11/333 |
| | | 398/147 |
| 2009/0284262 A1 | 11/2009 | Wand |
| 2014/0308047 A1 | 10/2014 | Mak et al. |

(Continued)

FOREIGN PATENT DOCUMENTS

| CN | 102054272 A | 5/2011 |
| CN | 105450295 A | 3/2016 |

OTHER PUBLICATIONS

Sung Joon Ahn et al., "Geometric Fitting of Line, Plane, Circle, Sphere, and Ellipse", ABW—Workshop 6, TA Esslingen 25.-26. 01. 1999.

*Primary Examiner* — Tesfaldet Bocure

(74) *Attorney, Agent, or Firm* — Staas & Halsey LLP

(57) ABSTRACT

A measurement method and apparatus for residual direct-current components and a system where the measurement method includes: selecting a section of data of a first predetermined length respectively from received signals in two polarization states; performing a coordinate transform on the two selected sections of data to obtain a group of vectors of Strokes space; and determining a difference between power of the residual direct-current components according to the group of vectors of Strokes space. With the embodiments of this disclosure, residual direct-current components of an optical transmitter may be measured at a receiver end of a coherent optical communication system, thereby avoiding diagnosis errors of a communication network, and improving performance of the communication system.

22 Claims, 7 Drawing Sheets

(56) References Cited

U.S. PATENT DOCUMENTS

2015/0280862 A1* 10/2015 Teplitsky .............. H04L 1/0045
 375/319
2016/0013863 A1 1/2016 Dou et al.
2018/0076889 A1* 3/2018 Chen ................ H04B 10/07953

* cited by examiner

MEASUREMENT METHOD AND APPARATUS FOR RESIDUAL DIRECT-CURRENT COMPONENTS AND A SYSTEM

CROSS-REFERENCE TO RELATED APPLICATIONS

This application claims the benefit of Chinese Application No. 201610822223.5, filed Sep. 13, 2016, in the Chinese Intellectual Property Office, the disclosure of which is incorporated herein by reference.

BACKGROUND

1. Field

This disclosure relates to the field of communication technologies, and in particular to a measurement method and apparatus for residual direct-current components of an optical transmitter and a system.

2. Description of the Related Art

In an optical communication system, direct-current components of an optical transmitter will result in a relatively large cost on final signal recovery and communication quality after passing through transmission links and being processed by an optical receiver. And as improvement of a communication rate and complexity of a network state, influence of such a cost will become more and more prominent.

In the prior art, the direct-current components of the optical transmitter may be reduced as possible by flexibly configuring a bias of a modulator of a coherent transmitter, thereby lowering the influence of the direct-current components of the optical transmitter (Reference Document 1). However, residual direct-current components always exist, whatever any transmitter configuration method is used. On the one hand, communication quality will be degraded. And on the other hand, as sizes of the residual direct-current components of the optical transmitter are unknown, it is possible that a diagnosis error may occur in surveillance and diagnosis of a communication network, thereby resulting in impropriety of countermeasures, and affecting the performance of the communication system.

Reference Document 1: US20140308047A1.

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

Additional aspects and/or advantages will be set forth in part in the description which follows and, in part, will be apparent from the description, or may be learned by practice of the invention.

It was found by the inventors in the implementation of this disclosure that as sizes of residual direct-current components of an optical transmitter are unknown, the residual direct-current components received at an optical receiver end may result in a diagnosis error of a communication network, thereby affecting the performance of the communication system.

In order to solve the above problem, this application proposes a measurement method and apparatus for residual direct-current components of an optical transmitter and a system.

According to a first aspect of the embodiments of this disclosure, there is provided a measurement method for residual direct-current components, applicable to a dual-polarization optical communication system; wherein, the method includes: a section of data of a first predetermined length is selected respectively from received signals in two polarization states; coordinate transform is performed on the selected two sections of data to obtain a group of vectors of Strokes space; and a difference between power of the residual direct-current components is determined according to the group of vectors of Strokes space.

According to a second aspect of the embodiments of this disclosure, there is provided a measurement method for residual direct-current components, applicable to a dual-polarization optical communication system; wherein, the method includes: a sum of power of residual direct-current components in two polarization states is measured; a difference between the power of the residual direct-current components in the two polarization states is measured; and power of residual direct-current component in each polarization state of an optical transmitter is calculated according to the sum of power and the difference between the power.

According to a third aspect of the embodiments of this disclosure, there is provided a measurement apparatus for residual direct-current components, applicable to a dual-polarization optical communication system; wherein, the apparatus includes: a selecting unit configured to select a section of data of a first predetermined length respectively from received signals in two polarization states; a transforming unit configured to perform coordinate transform on the two sections of data selected by the selecting unit to obtain a group of vectors of Strokes space; and a determining unit configured to determine a difference between power of the residual direct-current components according to the group of vectors of Strokes space.

According to a fourth aspect of the embodiments of this disclosure, there is provided a measurement apparatus for residual direct-current components, applicable to a dual-polarization optical communication system; wherein, the apparatus includes: a first measuring unit configured to measure a sum of power of residual direct-current components in two polarization states; a second measuring unit configured to measure a difference between the power of the residual direct-current components in the two polarization states; and a calculating unit configured to calculate power of residual direct-current component in each polarization state of an optical transmitter according to the sum of power measured by the first measuring unit and the difference between the power measured by the second measuring unit.

According to a fifth aspect of the embodiments of this disclosure, there is provided a receiver, including the apparatus as described in either one of the third and fourth aspects.

According to a sixth aspect of the embodiments of this disclosure, there is provided an optical communication system, including a transmitter and a receiver, and further including the apparatus as described in either one of the third and fourth aspects.

An advantage of the embodiments of this disclosure exists in that with the embodiments of this disclosure, residual direct-current components of an optical transmitter may be measured at a receiver end of an optical communication system, thereby avoiding a diagnosis error of a communication network, and improving performance of the communication system. And by measuring the residual direct-current components at the receiver end, it will not change topology and software and hardware configuration of an existing network, which is applicable to a coherent optical communication system of any modulation format.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the spirits and scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising/includes/including" when used in this specification is taken to specify the presence of stated features, integers, steps or components but does not preclude the presence or addition of one or more other features, integers, steps, components or groups thereof.

BRIEF DESCRIPTION OF THE DRAWINGS

The drawings are included to provide further understanding of this disclosure, which constitute a part of the specification and illustrate the exemplary embodiments of this disclosure, and are used for setting forth the principles of this disclosure together with the description. It is clear and understood that the accompanying drawings in the following description are some embodiments of this disclosure, and for those of ordinary skills in the art, other accompanying drawings may be obtained according to these accompanying drawings without making an inventive effort. In the drawings.

DETAILED DESCRIPTION

These and further aspects and features of the present disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims.

Embodiments of this disclosure provide a measurement method and apparatus for residual direct-current components of an optical transmitter and a system. In the method, residual direct-current components in an optical transmitter are measured by analyzing signals received by an optical receiver. As the residual direct-current components are measured at a receiver end in the method, topology and software and hardware configuration of an existing network will not be changed, no extra influence will be posed on an existing communication system. And this method is applicable to a coherent optical communication system of any modulation format, such as phase shift keying (PSK), and quadrature amplitude modulation (QAM), etc.

Various implementations of the embodiments of this disclosure will be described below with reference to the accompanying drawings. These implementations are illustrative only, and are not intended to limit the embodiments of this disclosure.

Embodiment 1

This embodiment provides a measurement method for residual direct-current components, applicable to a dual-polarization optical communication system.

Figure 1:
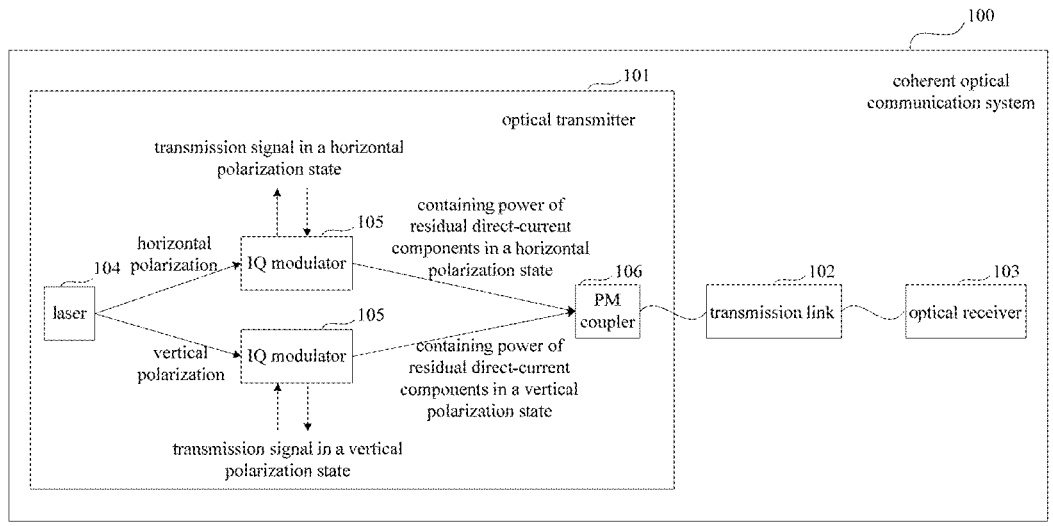
FIG. 1 is a schematic diagram of a dual-polarization coherent optical communication system 100.

FIG. 1 is a schematic diagram of the dual-polarization coherent optical communication system 100. As shown in FIG. 1, the coherent optical communication system 100 includes an optical transmitter 101, an optical receiver 103 and a transmission link 102. In this embodiment, the optical transmitter 101 includes a laser 104 outputting a dual-polarization optical signal, an IQ modulator 105, and a PM coupler 106, etc. As hardware or configuration of the optical transmitter 101 is not ideal, signals after being modulated by the IQ modulator 105 contain residual direct-current components in a horizontal polarization state and a vertical polarization state, and the signals containing the residual direct-current components are received by the optical receiver 101 after passing through the transmission link 102. By processing the signals received by the optical receiver 103 at a receiver end by using the method of this embodiment, the residual direct-current components may be measured and then may be used for analysis of BER (Bit Error Rate) performance, etc., thereby improving performance of the system.

Figure 2:
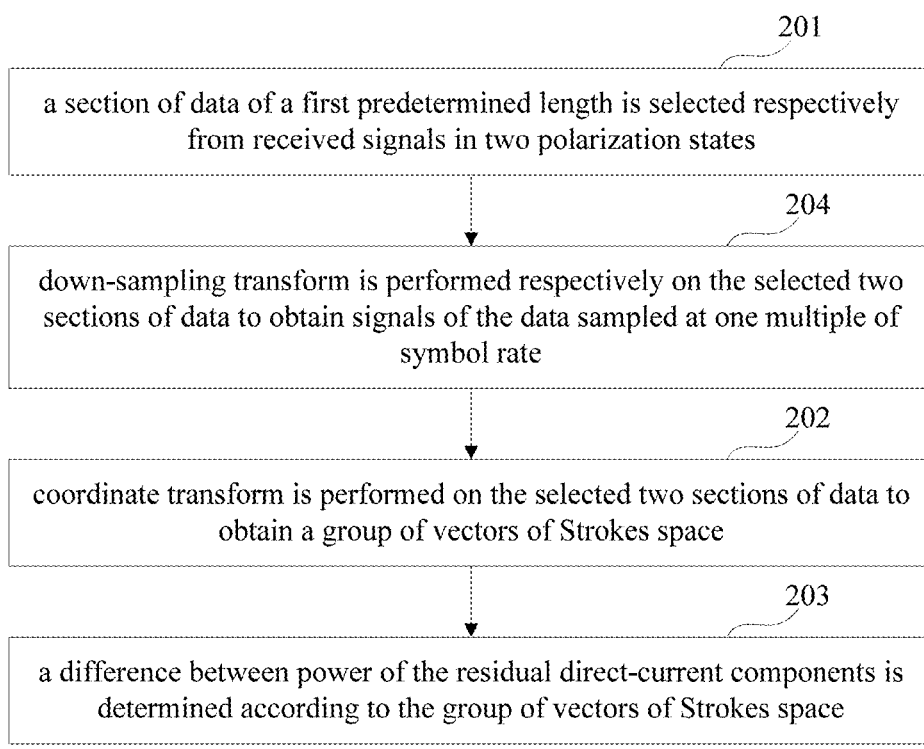
FIG. 2 is a flowchart of a measurement method for residual direct-current components of Embodiment 1 of this disclosure.

FIG. 2 is a flowchart of the measurement method for residual direct-current components of this embodiment. As shown in FIG. 2, the method includes:

step 201: a section of data of a first predetermined length is selected respectively from received signals in two polarization states;

step 202: coordinate transform is performed on the selected two sections of data to obtain a group of vectors of Strokes space; and step 203: a difference between power of the residual direct-current components is determined according to the group of vectors of Strokes space.

In this embodiment, the difference between power of the residual direct-current components is measured by using the group of vectors of Strokes space. As the measurement is performed at the receiver end, topology and software and hardware configuration of the network will not to be changed, and no extra influence will be posed on an existing optical communication system. After the difference between power of the residual direct-current components is measured by using the method of this embodiment, it may be applied to analysis of BER performance, etc., thereby improving performance of the system.

In step 201, a section of data of the first predetermined length may be selected respectively from the received signals in the two polarization states. The two polarization states here refer to a horizontal polarization state and a vertical polarization state, and the received signals in the two polarization states here are received from the optical receiver. Selection of the first predetermined length N2 here is related to measurement precision, and when the first predetermined length is relatively large, in the process of determination of the subsequent step 203, a measurement error is relatively small, but an amount of calculation is relatively large; and when the first predetermined length is relatively small, in the process of determination of the subsequent step 203, a measurement error is relatively large, but an amount of calculation is relatively small, which will be described in detail later. That is, the first predetermined length N2 may be selected according to an actual situation.

In step 202, the coordinate transform is performed on the selected two sections of data to obtain the group of vectors $\{s(n)\}$ of Strokes space, which may be expressed as:

$$s(n) = \begin{bmatrix} s_1(n) \\ s_2(n) \\ s_3(n) \end{bmatrix} = \begin{bmatrix} |E_X(n)|^2 - |E_Y(n)|^2 \\ 2\mathrm{Re}(E_X^*(n)E_Y(n)) \\ 2\mathrm{Im}(E_X^*(n)E_Y(n)) \end{bmatrix};$$

where, $E_X(n)$ and $E_Y(n)$ are two sections of data selected respectively from the received signals in the two polarization states, n is a number between 1 and N2 (the first predetermined length), which is a serial number of data, Re(•) is an operation of taking a real part, and Im(•) is an operation of taking an imaginary part. The above expression (a transform formula) is illustrative only, this embodiment is not limited thereto, and other implementable transform formulae are also contained in the scope of this application.

In step 203, the difference between power of the residual direct-current components may be determined according to the above obtained group of vectors of Strokes space.

Figure 3:
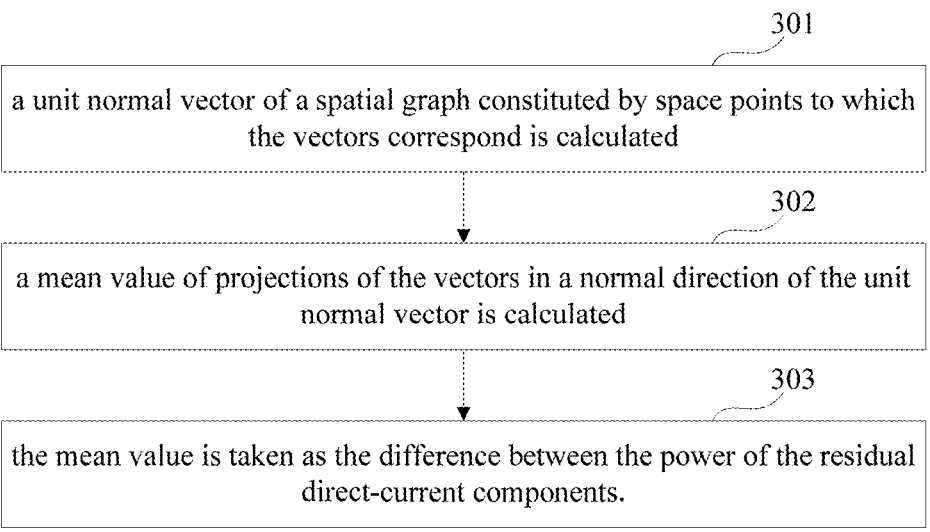
FIG. 3 is a flowchart of an implementation of step 203 of Embodiment 1 of this disclosure.

In an implementation, step 203 may be carried out by using a method shown in FIG. 3. As shown in FIG. 3, step 203 includes:

step 301: a unit normal vector of a spatial graph constituted by space points to which the vectors correspond is calculated;

step 302: a mean value of projections of the vectors in a normal direction of the unit normal vector is calculated; and step 303: the mean value is taken as the difference between the power of the residual direct-current components.

In step 301, for the transformed group of vectors $\{s(n)\}$ of Strokes space, a unit normal vector of a spatial graph constituted by the space points to which the vectors correspond may be calculated, which is marked by Normal. A method for calculating a unit normal vector corresponding to a graph according to a set of space points is not limited in this embodiment, for example, a method in Reference Document 2, "Sung Joon Ahn etc, "Geometric Fitting of Line, Plane, Circle, Sphere, and Ellipse", ABW-Workshop 6, T A Esslingen 25.-26. 01. 1999", may be employed.

In step 302, for the transformed group of vectors $\{s(n)\}$ of Strokes space, a mean value of the projections of the vectors in the normal direction Normal may be calculated, which is marked by Pb, that is, $$Pb = \frac{1}{N2} \sum_{n=1}^{N2} \langle s(n) \cdot \mathrm{Normal} \rangle.$$

In step 303, the above mean value Pb may be taken as the difference between the power $md_H$ of the residual direct-current component in the horizontal polarization state and the power $md_V$ of the residual direct-current component in the vertical polarization state, that is, $Pb = md_H - md_V$.

Figure 4:
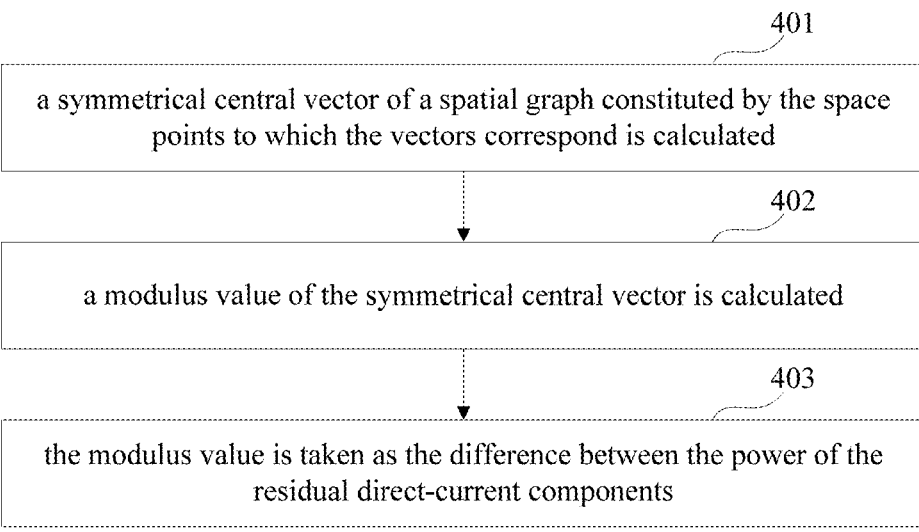
FIG. 4 is a flowchart of another implementation of step 203 of Embodiment 1 of this disclosure.

In another implementation, step 203 may also be carried out by using a method shown in FIG. 4. As shown in FIG. 4, step 203 includes:

step 401: a symmetrical central vector of a spatial graph constituted by the space points to which the vectors correspond is calculated;

step 402: a modulus value of the symmetrical central vector is calculated; and step 403: the modulus value is taken as the difference between the power of the residual direct-current components.

In step 401, a method for calculating the symmetrical central vector is not limited. For example, the symmetrical central vector may be calculated by using a calculation method in the prior art which is high in complexity but is high in accuracy, and the symmetrical central vector Center may also be calculated by using a calculation method shown by a formula below which is relatively simple but is moderate in accuracy:

$$\mathrm{Center} = \frac{1}{N2} \sum_{n=1}^{N2} s(n).$$

In step 402, after the above symmetrical central vector is calculated, a modulus value Pb' of the above symmetrical central vector may be calculated by using a formula as below:

$$Pb' = \|\mathrm{Center}\| = \sqrt{\mathrm{Center1}^2 + \mathrm{Center2}^2 + \mathrm{Center3}^2};$$

where, Center1, Center2 and Center3 are coordinate values of the above symmetrical central vector Center.

In step 403, the above modulus value Pb' may be taken as the difference between the power $md_H$ of the residual direct-current component in the horizontal polarization state and the power $md_V$ of the residual direct-current component in the vertical polarization state, that is, $Pb'=md_H-md_V$.

In this embodiment, as shown in FIG. 2, in order to improve precision of the measurement and a noise tolerance, the measurement method for residual direct-current components may further include:

step 204: down-sampling transform is performed respectively on the selected two sections of data to obtain signals of the data sampled at one multiple of symbol rate, so as to perform coordinate transform on the signals of the data in two polarization states sampled at one multiple of symbol rate.

Step 204 is executed before step 202; in this embodiment, the prior art may be referred to for a particular manner of down-sampling transform, and this embodiment is not limited thereto.

In this embodiment, after the difference between power of the residual direct-current components of the optical transmitter in the two polarization states is obtained, the power of the residual direct-current components of the optical transmitter in the two polarization states may be obtained by using an existing manner, and a particular manner is not limited in this embodiment. For example, a sum of the power of the residual direct-current components of the optical transmitter in the two polarization states may be obtained by using an existing manner, and then the power of the residual direct-current components of the optical transmitter in the two polarization states may be obtained finally in combination of the difference between power.

With the measurement method of the embodiment of this disclosure, the difference between power of the residual direct-current components of the optical transmitter in the two polarization states may be measured at the receiver end of the coherent optical communication system, thereby performing diagnosis and adjustment on the performance change of a communication network by estimating influence of the power of the residual direct-current components of the optical transmitter on BER performance, which may avoid a diagnosis error of the communication network, and improve the performance of the communication system. And by measuring the residual direct-current components by using the measurement method, it not only will not change topology and software and hardware configuration of an existing network, but also is applicable to a coherent optical communication system of any modulation format.

Embodiment 2

This embodiment provides a measurement method for residual direct-current components, applicable to the dual-polarization coherent optical communication system 100 shown in FIG. 1. By processing the signals received by the optical receiver 103 at a receiver end by using the method of this embodiment, the residual direct-current components may be measured and then may be used for analysis of BER performance, etc., thereby improving performance of the system.

Figure 5:
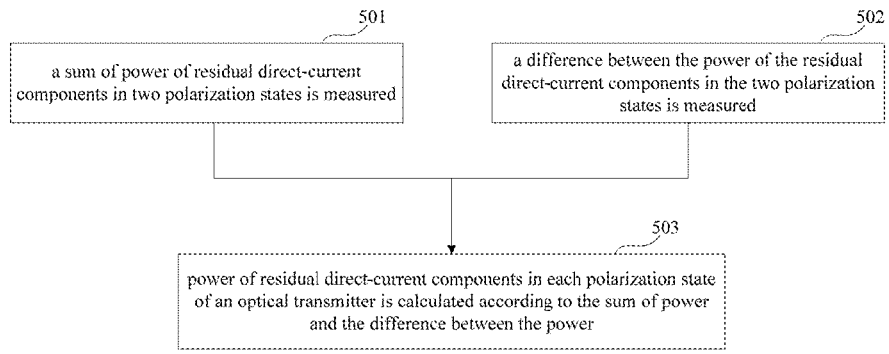
FIG. 5 is a flowchart of a measurement method for residual direct-current components of Embodiment 2 of this disclosure.

FIG. 5 is a flowchart of the measurement method for residual direct-current components of this embodiment. As shown in FIG. 5, the method includes:

step 501: a sum of power of residual direct-current components in two polarization states is measured;

step 502: a difference between the power of the residual direct-current components in the two polarization states is measured; and step 503: power of residual direct-current component in each polarization state of an optical transmitter is calculated according to the sum of power and the difference between the power.

Figure 6:
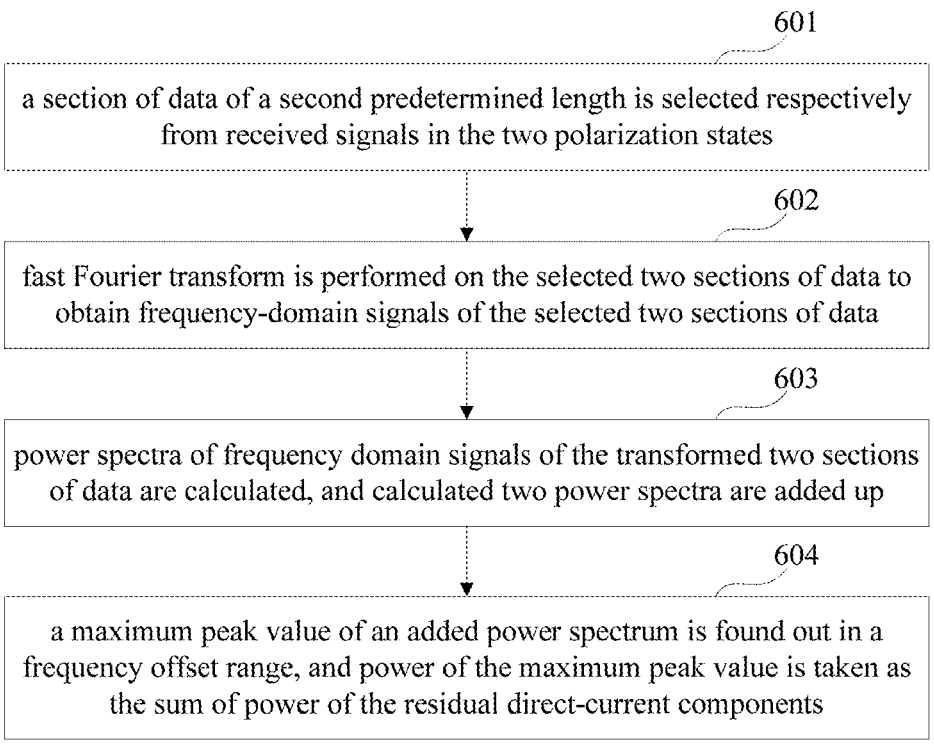
FIG. 6 is a flowchart of a measurement method for a sum of power of the residual direct-current components of Embodiment 2 of this disclosure.

In this embodiment, step 501 may be carried out by using a method of finding out a maximum peak in a frequency domain. As shown in FIG. 6, the method includes:

step 601: a section of data of a second predetermined length is selected respectively from received signals in the two polarization states;

step 602: fast Fourier transform is performed on the selected two sections of data to obtain frequency-domain signals of the selected two sections of data;

step 603: power spectra of frequency domain signals of the transformed two sections of data are calculated, and calculated two power spectra are added up; and step 604: a maximum peak value of an added power spectrum is found out in a frequency offset range, and power of the maximum peak value is taken as the sum of power of the residual direct-current components.

In step 601, a section of data of a second predetermined length may be respectively selected from the received signals in the two polarization states. The two polarization states here refer to a horizontal polarization state and a vertical polarization state, and the received signals in the two polarization states here are received from the optical receiver. Selection of the second predetermined length here is related to a size of phase noise and resolution of subsequent frequency domain processing, which is required to be appropriate in size. For example, the second predetermined length should not be too large, which needs to be less than a change period of phase noise of the optical communication system; however, the second predetermined length should not be too small, which needs to ensure an enough spectral resolution, that is, the selection of the second predetermined length needs to ensure that the spectral resolution is within a certain range. For example, for an optical communication system of a symbol rate of 30 G, the selection of the second predetermined length needs to ensure that the spectral resolution may be a value between 1 MHz and 100 MHz.

In step 602, fast Fourier transform may be performed respectively on the selected two sections of data to obtain frequency domain signals of the data. The prior art may be referred to for a particular transform method, which shall not be described herein any further.

In steps 603-604, power spectra of the frequency domain signals of the data may be calculated, and the calculated two power spectra may be added up to obtain an added power spectrum; and then the maximum peak value of the added power spectrum is found out in the frequency offset range, and its power is taken as the sum of power of the residual direct-current components.

In this embodiment, a method for calculating the power spectra of the frequency domain signals is not limited, and the prior art may be referred to.

In this embodiment, the frequency offset range refers to a range of a difference between frequencies of an oscillator laser and a carrier laser in the coherent optical communication system, and its empirical value may be, for example, 0 Hz-1 GHz.

In this embodiment, the prior art may be referred to for a method for finding out the maximum peak value of the power spectrum in the frequency offset range, which will not be described herein any further.

In this embodiment, power Pa of the above maximum peak value may be expressed as:

$$Pa=P_{XY,N1}(f0);$$

where, X and Y are the above received signals in the two polarization states, N1 is the above second predetermined length, and f0 is a frequency at the position of the above maximum peak value.

In this embodiment, the power Pa of the above maximum peak value may be taken as a sum of the power $md_H$ of the residual direct-current component in the horizontal polarization state and the power $md_V$ of the residual direct-current component in the vertical polarization state, that is, $Pa=md_H+md_V$.

In this embodiment, description is given taking that the sum of power of the residual direct-current components is measured by using the method of finding out a maximum peak in a frequency domain as an example. However, this embodiment is not limited thereto, and other implementable methods may be used in step 501 to measure the sum of power of the residual direct-current components.

In this embodiment, step 502 may be carried out by using the method of Embodiment 1, the contents of which being incorporated herein, which shall not be described herein any further.

In step 503, after the sum Pa of the power of the residual direct-current components in the two polarization states and the difference Pb between the power of the residual direct-current components in the two polarization states are obtained, the power $md_H$ of the residual direct-current component in the horizontal polarization state and the power $md_V$ of the residual direct-current component in the vertical polarization state may be obtained, which are expressed as:

$$md_H = \frac{Pa+Pb}{2}$$
$$md_V = \frac{Pa-Pb}{2}.$$

Figure 7:
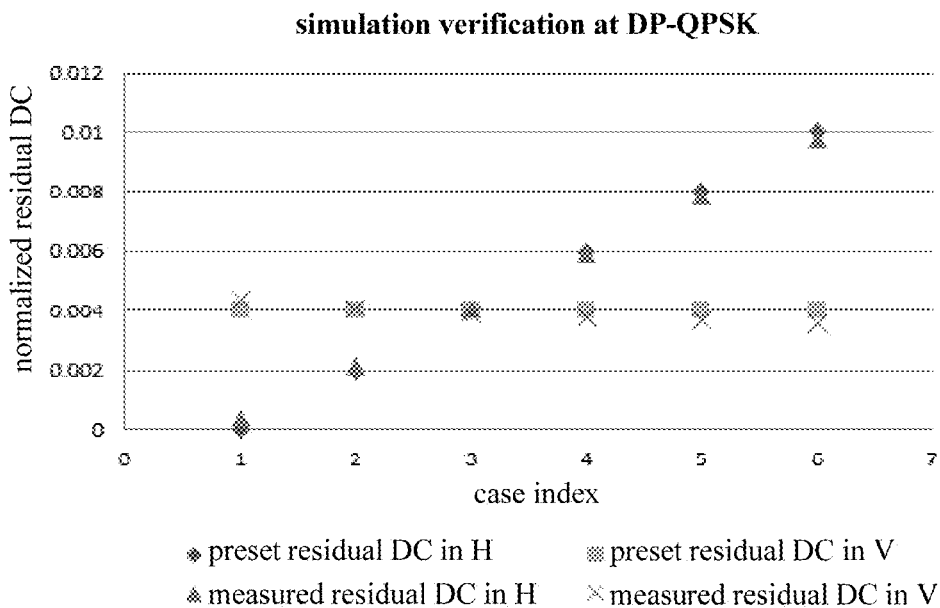
FIG. 7 is a schematic diagram of verifying a measurement result of the measurement method for residual direct-current components of Embodiment 2 of this disclosure.

FIG. 7 is a schematic diagram of verifying a measurement result of the measurement method for residual direct-current components of this embodiment. As shown in FIG. 7, a modulation format of the optical communication system being dual-polarization quadrature phase shift keying (DP-QPSK) is taken as an example. It can be seen from FIG. 7 that values of a residual direct-current (DC) component in the horizontal polarization state measured by using the method of this embodiment are close to preset values of a residual direct-current component in the horizontal polarization state, and values of a residual direct-current (DC) component in the vertical polarization state measured by using the method of this embodiment are close to preset values of a residual direct-current component in the vertical polarization state; that is, a verifying result shows that the measurement method for residual direct-current components in this embodiment is accurate and feasible.

With the measurement method of the embodiment of this disclosure, the power of the residual direct-current components of the optical transmitter may be measured according to the sum of power and the difference between power of the residual direct-current components of the optical transmitter in the two polarization states measured at the receiver end of the coherent optical communication system, thereby performing diagnosis and adjustment on the performance change of a communication network by estimating influence of the power of the residual direct-current components of the optical transmitter on BER performance, which may avoid a diagnosis error of the communication network, and improve the performance of the communication system. And by measuring the residual direct-current components by using the measurement method, it not only will not change topology and software and hardware configuration of an existing network, but also is applicable to a coherent optical communication system of any modulation format.

The measurement method for residual direct-current components of the transmitter is described in above embodiments 1 and 2, by which the power of the residual direct-current components of the transmitter is obtained, and ratios of power of signals to the power of the residual direct-current components may further be calculated accordingly. As the ratios are related to transmission characteristic, the method may be applicable to measurement and analysis of BER performance, thereby improving the performance of the system.

Taking a dual-polarization optical communication system as an example, in this embodiment, power $Ps_H$ and $Ps_V$ of signals in the two polarization states may further be measured, and based on the power of the residual direct-current components in the two polarization states, the ratios of power of signals to the power of the residual direct-current components may be obtained.

In this embodiment, the above ratios $R_H$ and $R_V$ of the power of signals to the power of the residual direct-current components may be expressed as:

$$R_H=Ps_H/md_H,$$

$$R_V=Ps_V/md_V;$$

where, $Ps_H$ is the power of the signal in the horizontal state, $Ps_V$ is the power of the signal in the vertical state, $md_H$ is the power of the residual direct-current component in the horizontal polarization state, and $md_V$ is the power of the residual direct-current component in the vertical polarization state.

In this embodiment, a ratio R of power of total signals to power of total residual direct-current components in the two polarization states may be expressed as:

$$R=(Ps_H+Ps_V)/(md_H+Md_V).$$

A method for measuring the power $Ps_H$ and $Ps_V$ of the signals in the two polarization states is not limited in this embodiment, and existing means may be employed, which will not be described herein any further.

Embodiment 3

This embodiment provides a measurement apparatus for residual direct-current components, applicable to the dual-polarization coherent optical communication system 100 shown in FIG. 1. As principles of the apparatus for solving problems are similar to that of the method of Embodiment 1, the implementation of the method of Embodiment 1 may be referred to for implementation of the apparatus, with identical contents being not going to be described herein any further.

Figure 8:
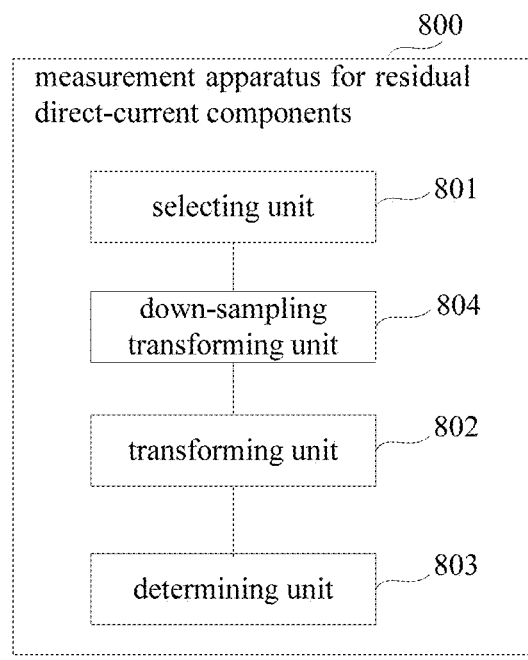
FIG. 8 is a schematic diagram of a structure of a measurement apparatus 800 for residual direct-current components of Embodiment 3 of this disclosure.

FIG. 8 is a schematic diagram of the measurement apparatus for residual direct-current components of this embodiment. As shown in FIG. 8, the apparatus 800 includes:
  a selecting unit or selector 801 configured to select a section of data of a first predetermined length respectively from received signals in two polarization states;
  a transforming unit or transformer 802 configured to perform coordinate transform on the two sections of data selected by the selecting unit 801 to obtain a group of vectors of Strokes space; and
  a determining unit or determinor 803 configured to determine a difference between power of the residual direct-current components according to the group of vectors of Strokes space.

In this embodiment, the group of vectors {s(n)} of Strokes space obtained after the transforming unit 802 performs the coordinate transform may be expressed as:

$$s(n) = \begin{bmatrix} s_1(n) \\ s_2(n) \\ s_3(n) \end{bmatrix} = \begin{bmatrix} |E_X(n)|^2 - |E_Y(n)|^2 \\ 2\text{Re}(E_X^*(n)E_Y(n)) \\ 2\text{Im}(E_X^*(n)E_Y(n)) \end{bmatrix};$$

where, $E_X(n)$ and $E_Y(n)$ are two sections of data selected respectively from the received signals in the two polarization states, n is a number from 1 to N2 (the first predetermined length), which is a serial number of data, Re(•) is an operation of taking a real part, and Im(•) is an operation of taking an imaginary part.

Figure 9:
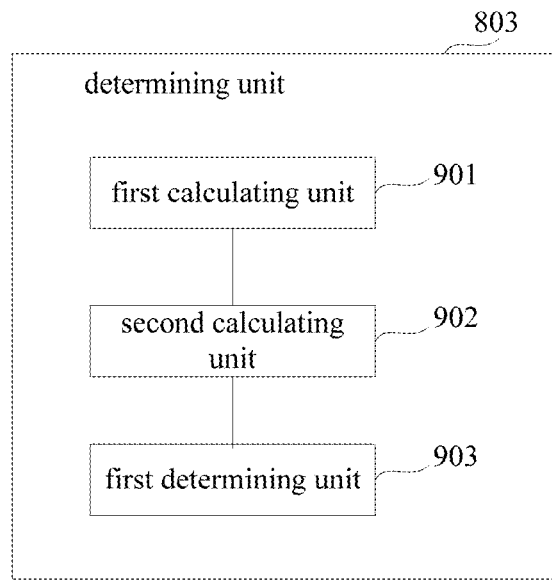
FIG. 9 is a schematic diagram of a structure of an implementation of a determining unit 803 of Embodiment 3 of this disclosure.

In an implementation, as shown in FIG. 9, the determining unit 803 may include:

a first calculating unit 901 configured to calculate a unit normal vector of a spatial graph constituted by space points to which the vectors correspond;

a second calculating unit 902 configured to calculate a mean value of projections of the vectors in a normal direction of the unit normal vector; and a first determining unit 903 configured to take the mean value as the difference between the power of the residual direct-current components.

In this implementation, the above mean value Pb may be expressed as:

$$Pb = \frac{1}{N2} \sum_{n=1}^{N2} \langle s(n) \cdot \text{Normal} \rangle;$$

where, N2 is the first predetermined length, Normal is the unit normal vector, and s(n) is the group of vectors of Strokes space.

In this implementation, the first determining unit 903 may take the above mean value Pb as the difference between the power $md_H$ of the residual direct-current component in the horizontal polarization state and the power $md_V$ of the residual direct-current component in the vertical polarization state, that is, $Pb = md_H - md_V$.

Figure 10:
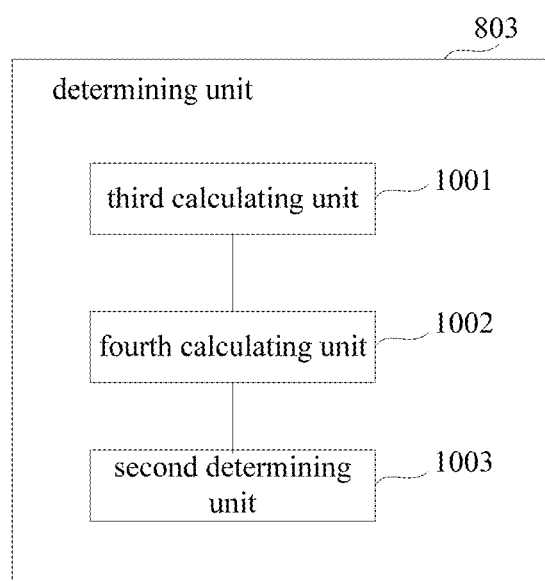
FIG. 10 is a schematic diagram of a structure of another implementation of the determining unit 803 of Embodiment 3 of this disclosure.

In another implementation, as shown in FIG. 10, the determining unit 803 may include:

a third calculating unit 1001 configured to calculate a symmetrical central vector of a spatial graph constituted by the space points to which the vectors correspond;

a fourth calculating unit 1002 configured to calculate a modulus value of the symmetrical central vector; and a second determining unit 1003 configured to take the modulus value as the difference between the power of the residual direct-current components.

In this implementation, the above symmetrical central vector Center may be expressed as:

$$\text{Center} = \frac{1}{N2} \sum_{n=1}^{N2} s(n);$$

where, N2 is the first predetermined length, and s(n) is the group of vectors of Strokes space.

In this implementation, a modulus value Pb' of the above symmetrical central vector may be expressed as:

$$Pb' = \|\text{Center}\| = \sqrt{\text{Center1}^2 + \text{Center2}^2 + \text{Center3}^2};$$

where, Center1, Center2 and Center3 are coordinate values of the above symmetrical central vector Center.

In this implementation, the second determining unit 1003 may take the above modulus value Pb' as the difference between the power $md_H$ of the residual direct-current component in the horizontal polarization state and the power $md_V$ of the residual direct-current component in the vertical polarization state, that is, $Pb' = md_H - md_V$.

In this embodiment, as shown in FIG. 8, in order to improve precision of the measurement and a noise tolerance, the measurement apparatus 800 for residual direct-current components, which may be a processor, may further include a down-sampling transforming unit 804 configured to perform down-sampling transform respectively on the two sections of data selected by the selecting unit 801 to obtain signals of the data sampled at one multiple of symbol rate, and provide the signals to the transforming unit 802, so that the transforming unit 802 performs coordinate transform on the signals of the data in two polarization states sampled at one multiple of symbol rate.

In this embodiment, as described above, after the difference between power of the residual direct-current components of the optical transmitter in the two polarization states is obtained, the power of the residual direct-current components of the optical transmitter in the two polarization states may be obtained by using an existing manner, thereby performing diagnosis and adjustment on the performance change of a communication network by estimating influence of the power of the residual direct-current components of the optical transmitter on BER performance, which may avoid a diagnosis error of the communication network, and improve the performance of the communication system. And by measuring the residual direct-current components by using the apparatus, it not only will not change topology and software and hardware configuration of an existing network, but also is applicable to a coherent optical communication system of any modulation format.

Embodiment 4

This embodiment provides a measurement apparatus for residual direct-current components, applicable to the dual-polarization coherent optical communication system 100 shown in FIG. 1. As principles of the apparatus for solving problems are similar to that of the method of Embodiment 2, the implementation of the method of Embodiment 2 may be referred to for implementation of the apparatus, with identical contents being not going to be described herein any further.

Figure 11:
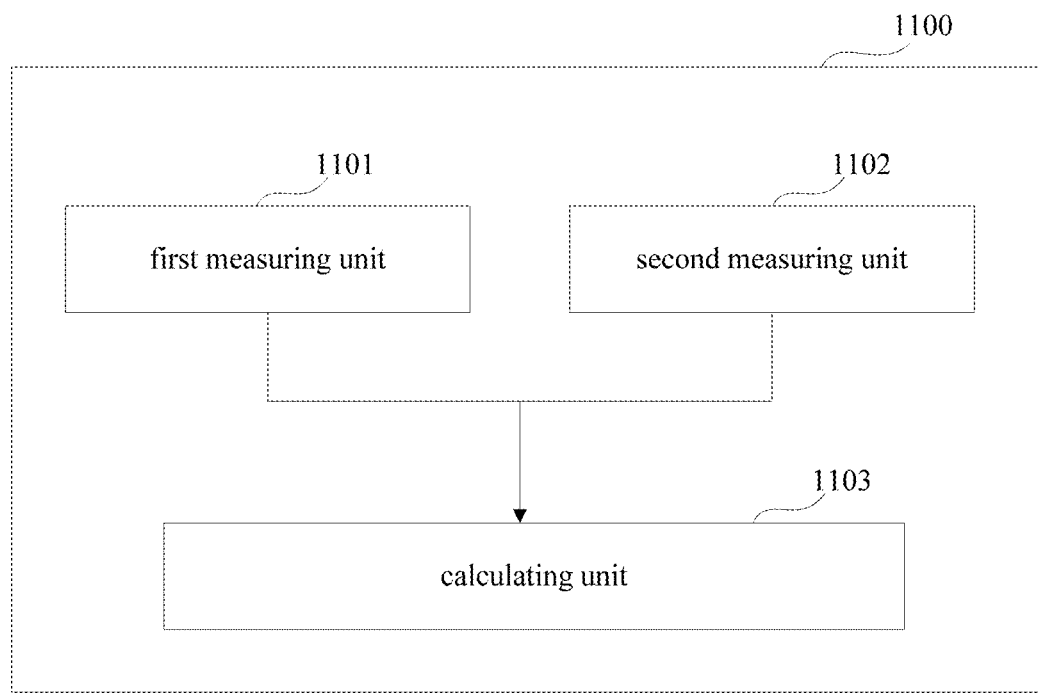
FIG. 11 is a schematic diagram of a structure of a measurement apparatus 1100 for residual direct-current components of Embodiment 4 of this disclosure.

FIG. 11 is a schematic diagram of the measurement apparatus for residual direct-current components of this embodiment. As shown in FIG. 11, the apparatus 1100 includes:

a first measuring unit 1101 configured to measure a sum of power of residual direct-current components in two polarization states;

a second measuring unit 1102 configured to measure a difference between the power of the residual direct-current components in the two polarization states; and a calculating unit 1103 configured to calculate power of residual direct-current component in each polarization state of an optical transmitter according to the sum of power measured by the first measuring unit 1101 and the difference between power measured by the second measuring unit 1102.

In this embodiment, a particular implementation of the first measuring unit 1101 is identical to that of step 501 in Embodiment 2, the contents of which being incorporated herein, and being not going to be described herein any further.

In this embodiment, the second measuring unit 1102 may be carried out by the measurement apparatus 800 for residual direct-current components in Embodiment 3, the contents of which being incorporated herein, and being not going to be described herein any further.

In this embodiment, a particular implementation of the calculating unit 1103 is identical to that of step 503 in Embodiment 2, the contents of which being incorporated herein, and being not going to be described herein any further.

In this embodiment, after the power of the residual direct-current components of the optical transmitter in the two polarization states is obtained, ratios of power of signals to the power of the residual direct-current components may further be calculated. As the ratios are related to transmission characteristic, the method may be applicable to measurement and analysis of BER performance, thereby improving the performance of the system. In this embodiment, the ratios of power of the signals to the power of the residual direct-current components are obtained by calculating the ratios of the power $Ps_H$ and $Ps_V$ of signals in the two polarization states to the power of the residual direct-current components in the two polarization states, and a method for calculating the power $Ps_H$ and $Ps_V$ of signals in the two polarization states is not limited in this embodiment.

With the measurement apparatus of the embodiment of this disclosure, the power of the residual direct-current components of the optical transmitter in the two polarization states may be measured according to the sum of power and the difference between power of the residual direct-current components of the optical transmitter in the two polarization states measured at the receiver end of the coherent optical communication system, thereby performing diagnosis and adjustment on the performance change of a communication network by estimating influence of the power of the residual direct-current components of the optical transmitter on BER performance, which may avoid a diagnosis error of the communication network, and improve the performance of the communication system. And by measuring the residual direct-current components by using the apparatus, it not only will not change topology and software and hardware configuration of an existing network, but also is applicable to a coherent optical communication system of any modulation format.

Embodiment 5

Figure 12:
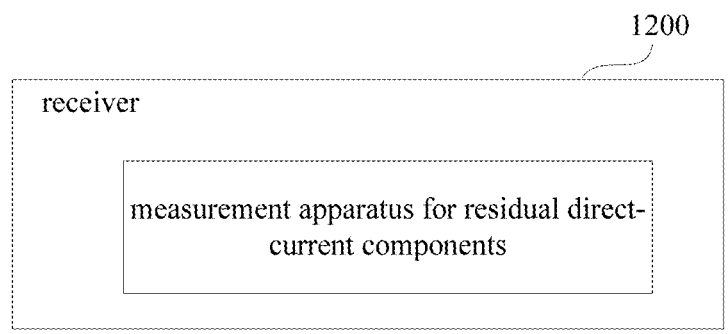
FIG. 12 is a schematic diagram of a structure of an implementation of a receiver of Embodiment 5 of this disclosure.

This embodiment provides a receiver. As shown in FIG. 12, the receiver 1200 may include the measurement apparatus for residual direct-current components as described in either one of embodiments 3 and 4. As the measurement apparatus 800 for residual direct-current components and the measurement apparatus 1100 for residual direct-current components are described in detail in embodiments 3 and 4, the contents of which are incorporated herein, and will not be described herein any further.

Figure 13:
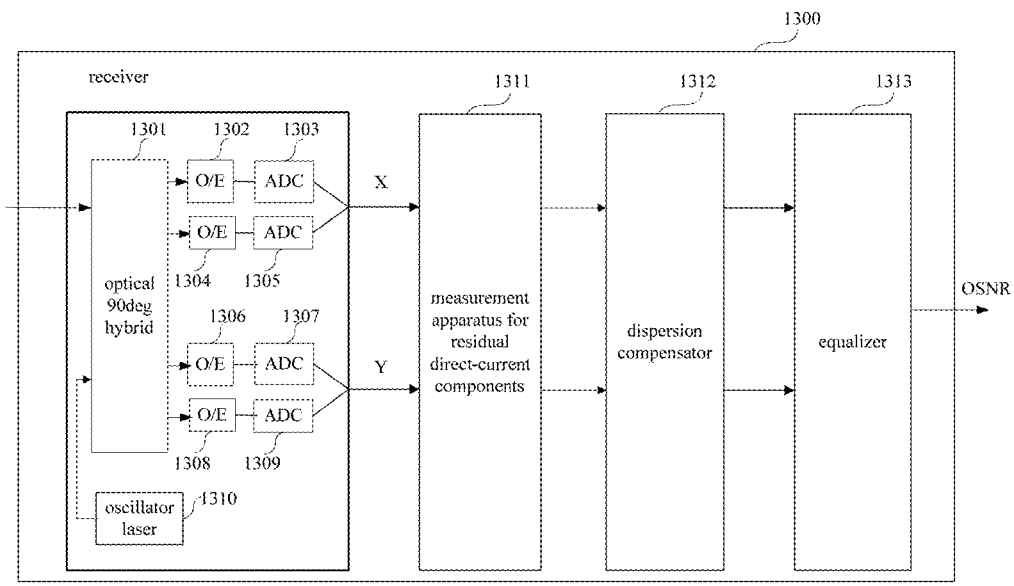
FIG. 13 is a schematic diagram of a structure of another implementation of the receiver of Embodiment 5 of this disclosure.

FIG. 13 is a block diagram of a systematic structure of the receiver of the embodiment of this disclosure. As shown in FIG. 13, the receiver 1300 includes:

a front end configured to convert an inputted optical signal into baseband signals in two polarization states, in this embodiment, the two polarization states including an H polarization state and a V polarization state.

As shown in FIG. 13, the front end includes an oscillator laser 1310, an optical 90 deg hybrid 1301, opto-electronic (O/E) detectors 1302, 1304, 1306 and 1308, analog-to-digital converters (ADCs) 1303, 1305, 1307 and 1309, a dispersion compensator 1312, an equalizer 1313 and a measurement apparatus 1311 for residual direct-current components; wherein, the measurement apparatus 1311 for residual direct-current components may have a structure and functions identical to those described in Embodiment 3 or 4, and will not be described herein any further; the oscillator laser 1310 is configured to provide a local light source; an optical signal is converted into a baseband signal in a polarization state after passing through the optical 90 deg hybrid 1301, the opto-electronic (O/E) detectors 1302 and 1304 and the analog-to-digital converters (ADCs) 1303 and 1305; and the optical signal is converted into a baseband signal in another polarization state after passing through the optical 90 deg hybrid 1301, the opto-electronic (O/E) 1306 and 1308 and the analog-to-digital converters (ADCs) 1307 and 1309, with a detailed process being similar to that in the prior art, and being not going to be described herein any further.

Furthermore, if a frequency difference and phase noise have effect on estimation of an OSNR, the receiver 1300 may further include a frequency difference compensator and a phase noise compensator (not shown). And the structure of the receiver 1300 shown in FIG. 13 is illustrative only, and in particular implementation, some components may be added or removed as demanded.

With the receiver of the embodiment of this disclosure, the residual direct-current components of the optical transmitter may be measured accurately at the receiver end of the coherent optical communication system, thereby avoiding a diagnosis error of a communication network, and improving the performance of the communication system. And by measuring the residual direct-current components by using the optical receiver, it not only will not change topology and software and hardware configuration of an existing network, but also is applicable to a coherent optical communication system of any modulation format.

Embodiment 6

Figure 14:
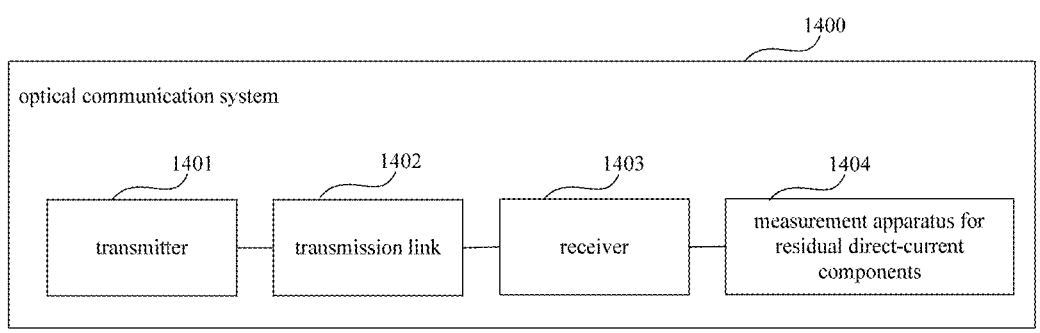
FIG. 14 is a schematic diagram of a structure of an optical communication system of Embodiment 6 of this disclosure.

This embodiment further provides an optical communication system. FIG. 14 is a schematic diagram of a structure of the optical communication system of this embodiment. As shown in FIG. 14, the optical communication system 1400 includes a transmitter 1401, a transmission link 1402, a receiver 1403 and a measurement apparatus 1404 for residual direct-current components.

In this embodiment, a structure and functions of the measurement apparatus 1404 for residual direct-current components are identical to those described in either one of embodiments 3 and 4, and will not be described herein any further.

In this embodiment, the measurement apparatus 1404 for residual direct-current components may also be integrated into the receiver 1403, and taken as a module of the receiver 1403.

In this embodiment, the transmitter 1401 and the transmission link 1402 may have structures and functions of an existing transmission link, and structures and functions of the transmitter and the transmission link are not limited in this embodiment.

With the optical communication system of the embodiment of this disclosure, the residual direct-current components of the optical transmitter may be measured at the receiver end of the optical communication system, thereby avoiding a diagnosis error of a communication network, and improving the performance of the communication system. And by measuring the residual direct-current components by using the coherent optical communication system, it not only will not change topology and software and hardware configuration of an existing network, but also is applicable to a coherent optical communication system of any modulation format.

An embodiment of the present disclosure provides a computer readable program code, which, when executed in a receiver, will cause the receiver to carry out the method described in either of embodiments 1 and 2.

An embodiment of the present disclosure provides a non-transitory computer readable storage medium, including a computer readable program code, which will cause a receiver to carry out the method described in either of embodiments 1 and 2.

The above apparatuses and methods of the present disclosure may be implemented by hardware, or by hardware in combination with software. The present disclosure relates to such a computer-readable program that when the program is executed by a logic device, the logic device is enabled to carry out the apparatus or components as described above, or to carry out the methods or steps as described above. The present disclosure also relates to a storage medium for storing the above program, such as a hard disk, a floppy disk, a CD, a DVD, and a flash memory, etc.

The present disclosure is described above with reference to particular embodiments. However, it should be understood by those skilled in the art that such a description is illustrative only, and not intended to limit the protection scope of the present disclosure. Various variants and modifications may be made by those skilled in the art according to the spirits and principles of the present disclosure, and such variants and modifications fall within the scope of the present disclosure.

For implementations of the present disclosure containing the above embodiments, following supplements are further disclosed.

Supplement 1. A measurement apparatus for residual direct-current components, applicable to a dual-polarization optical communication system, the measurement apparatus including:
  a selecting unit configured to select a section of data of a first predetermined length respectively from received signals in two polarization states;
  a transforming unit configured to perform coordinate transform on the two sections of data selected by the selecting unit to obtain a group of vectors of Strokes space; and
  a determining unit configured to determine a difference between power of the residual direct-current components according to the group of vectors of Strokes space.

Supplement 2. The measurement apparatus according to supplement 1, wherein the measurement apparatus further includes:
  a down-sampling transforming unit configured to perform down-sampling transform respectively on the two sections of data selected by the selecting unit to obtain signals of the data sampled at one multiple of symbol rate, and provide the signals to the transforming unit, so that the transforming unit performs coordinate transform on the signals of the data in two polarization states sampled at one multiple of symbol rate.

Supplement 3. The measurement apparatus according to supplement 1, wherein the group of vectors {s(n)} of Strokes space is expressed as:

$$s(n) = \begin{bmatrix} s_1(n) \\ s_2(n) \\ s_3(n) \end{bmatrix} = \begin{bmatrix} |E_X(n)|^2 - |E_Y(n)|^2 \\ 2\mathrm{Re}(E_X^*(n)E_Y(n)) \\ 2\mathrm{Im}(E_X^*(n)E_Y(n)) \end{bmatrix};$$

where, $E_X(n)$ and $E_Y(n)$ are the two sections of data respectively selected from the received signals in the two polarization states, n is a number from 1 to the first predetermined length, which is a data index, $\mathrm{Re}(\bullet)$ is an operation of taking a real part, and $\mathrm{Im}(\bullet)$ is an operation of taking an imaginary part.

Supplement 4. The measurement apparatus according to supplement 1, wherein the determining unit includes:
  a first calculating unit configured to calculate a unit normal vector of a spatial graph constituted by space points to which the vectors correspond;
  a second calculating unit configured to calculate a mean value of projections of the vectors in a normal direction of the unit normal vector; and
  a first determining unit configured to take the mean value as the difference between the power of the residual direct-current components.

Supplement 5. The measurement apparatus according to supplement 4, wherein the mean value is expressed as:

$$Pb = \frac{1}{N2} \sum_{n=1}^{N2} \langle s(n) \cdot \mathrm{Normal} \rangle;$$

where, N2 is the first predetermined length, Normal is the unit normal vector, s(n) is the group of vectors of Strokes space.

Supplement 6. The measurement apparatus according to supplement 1, wherein the determining unit includes:
  a third calculating unit configured to calculate a symmetrical central vector of a spatial graph constituted by the space points to which the vectors correspond;
  a fourth calculating unit configured to calculate a modulus value of the symmetrical central vector; and
  a second determining unit configured to take the modulus value as the difference between the power of the residual direct-current components.

Supplement 7. The measurement apparatus according to supplement 6, wherein the symmetrical central vector is expressed as:

$$\mathrm{Center} = \frac{1}{N2} \sum_{n=1}^{N2} s(n);$$

where, N2 is the first predetermined length, and s(n) is the group of vectors of Strokes space.

Supplement 8. A measurement apparatus for residual direct-current components, applicable to a dual-polarization optical communication system, the measurement apparatus including:
  a first measuring unit configured to measure a sum of power of residual direct-current components in two polarization states;
  a second measuring unit configured to measure a difference between the power of the residual direct-current components in the two polarization states; and a calculating unit configured to calculate power of residual direct-current component in each polarization state of an optical transmitter according to the sum of power measured by the first measuring unit and the difference between the power measured by the second measuring unit.

Supplement 9. The measurement apparatus according to supplement 8, wherein the first measuring unit is configured to:

select a section of data of a second predetermined length respectively from the received signals in the two polarization states;

perform fast Fourier transform on the selected two sections of data to obtain frequency-domain signals of the two sections of data;

calculate power spectra of the frequency-domain signals of the transformed two sections of data, and add up the calculated two power spectra; and find out a maximum peak value of an added power spectrum in a frequency offset range, and take power of the maximum peak value as the sum of the power of the residual direct-current components.

Supplement 10. The measurement apparatus according to supplement 9, wherein a principle for selecting the second predetermined length is that the second predetermined length is less than a change period of phase noise of the optical communication system, the selection of the second predetermined length ensures that a spectral resolution is within a certain range.

Supplement 11. The measurement apparatus according to supplement 9, wherein power Pa of the maximum peak value is expressed as:

$$Pa = P_{XY,N1}(f0);$$

where, X and Y are the above received signals in the two polarization states, N1 is the above second predetermined length, and f0 is a frequency at the position of the above maximum peak value.

Supplement 12. The measurement apparatus according to supplement 8, wherein the second measuring unit is configured to:

select a section of data of a first predetermined length respectively from received signals in the two polarization states;

perform coordinate transform on the two sections of selected data to obtain a group of vectors of Strokes space; and determine a difference between power of the residual direct-current components according to the group of vectors of Strokes space.

Supplement 13. The measurement apparatus according to supplement 12, wherein the second measuring unit is further configured to:

perform down-sampling transform respectively on the selected two sections of data, so as to perform coordinate transform on the signals of the data in two polarization states sampled at one multiple of symbol rate.

Supplement 14. The measurement apparatus according to supplement 12, wherein the group of vectors $\{s(n)\}$ of Strokes space is expressed as:

$$s(n) = \begin{bmatrix} s_1(n) \\ s_2(n) \\ s_3(n) \end{bmatrix} = \begin{bmatrix} |E_X(n)|^2 - |E_Y(n)|^2 \\ 2\mathrm{Re}(E_X^*(n)E_Y(n)) \\ 2\mathrm{Im}(E_X^*(n)E_Y(n)) \end{bmatrix};$$

where, $E_X(n)$ and $E_Y(n)$ are two sections of data selected respectively from the received signals in the two polarization states, n is a number from 1 to N2 (the first predetermined length), which is a serial number of data, Re(•) is an operation of taking a real part, and Im(•) is an operation of taking an imaginary part.

Supplement 15. The measurement apparatus according to supplement 12, wherein the second measuring unit is further configured to:

calculate a unit normal vector of a spatial graph constituted by space points to which the vectors correspond;

calculate a mean value of projections of the vectors in a normal direction of the unit normal vector; and take the mean value as the difference between the power of the residual direct-current components.

Supplement 16. The measurement apparatus according to supplement 15, wherein the mean value is expressed as:

$$Pb = \frac{1}{N2} \sum_{n=1}^{N2} \langle s(n) \cdot \mathrm{Normal} \rangle;$$

where, N2 is the first predetermined length, Normal is the unit normal vector, and s(n) is the group of vectors of Strokes space.

Supplement 17. The measurement apparatus according to supplement 12, wherein the second measuring unit is further configured to:

calculate a symmetrical central vector of a spatial graph constituted by the space points to which the vectors correspond;

calculate a modulus value of the symmetrical central vector; and take the modulus value as the difference between the power of the residual direct-current components.

Supplement 18. The measurement apparatus according to supplement 17, wherein the symmetrical central vector is expressed as:

$$\mathrm{Center} = \frac{1}{N2} \sum_{n=1}^{N2} s(n);$$

where, N2 is the first predetermined length, and s(n) is the group of vectors of Strokes space.

Supplement 19. A receiver, applicable to a dual-polarization optical communication system; wherein, the receiver includes the measurement apparatus for residual direct-current components as described in any one of supplements 1-18.

What is claimed is:

1. A measurement apparatus for residual direct-current components, applicable to a dual-polarization optical communication system, the measurement apparatus comprising:

a memory that stores a plurality of instructions; and a processor coupled to the memory and configured to execute the instructions to:

select a section of data of a first predetermined length respectively from received signals in two polarization states;

perform a coordinate transform on two selected sections of data to obtain a group of vectors of Strokes space; and determine a difference between power of the residual direct-current components according to the group of vectors of the Strokes space, wherein, performance of the dual-polarization optical communication system is diagnosed or improved in accordance with the determined difference between power of the residual direct-current components.

2. The measurement apparatus according to claim 1, wherein the processor is further configured to execute the instructions to:

configured to perform a down-sampling transform respectively on the two selected sections of data to obtain signals of data sampled at one multiple of symbol rate, and provide the signals to perform coordinate transform on the signals of the data in two polarization states sampled at one multiple of symbol rate.

3. The measurement apparatus according to claim 1, wherein the group of vectors {s(n)} of Strokes space is expressed as:

$$s(n) = \begin{bmatrix} s_1(n) \\ s_2(n) \\ s_3(n) \end{bmatrix} = \begin{bmatrix} |E_X(n)|^2 - |E_Y(n)|^2 \\ 2\text{Re}(E_X^*(n)E_Y(n)) \\ 2\text{Im}(E_X^*(n)E_Y(n)) \end{bmatrix};$$

where, $E_x(n)$ and $E_y(n)$ are the two sections of data respectively selected from the received signals in the two polarization states, n is a number from 1 to the first predetermined length, which is a data index, Re(•) is an operation of taking a real part, and Im(•) is an operation of taking an imaginary part.

4. The measurement apparatus according to claim 1, wherein the processor is configured to execute the instructions to:

calculate a unit normal vector of a spatial graph constituted by space points to which the vectors correspond;

calculate a mean value of projections of the vectors in a normal direction of the unit normal vector; and use the mean value as the difference between the power of the residual direct-current components.

5. The measurement apparatus according to claim 4, wherein the mean value is expressed as:

$$Pb = \frac{1}{N2} \sum_{n=1}^{N2} \langle s(n) \cdot \text{Normal} \rangle;$$

where, N2 is the first predetermined length, Normal is the unit normal vector, s(n) is the group of vectors of Strokes space, and <•> is an operation of an inner product of the vector, i.e. an operation of taking a projection.

6. The measurement apparatus according to claim 1, wherein the processor is configured to execute the instructions to:

calculate a symmetrical central vector of a spatial graph constituted by the space points to which the vectors correspond;

calculate a modulus value of the symmetrical central vector; and take the modulus value as the difference between the power of the residual direct-current components.

7. The measurement apparatus according to claim 6, wherein the symmetrical central vector is expressed as:

$$\text{Center} = \frac{1}{N2} \sum_{n=1}^{N2} s(n);$$

where, N2 is the first predetermined length, and s(n) is the group of vectors of Strokes space.

8. A receiver, applicable to a dual-polarization optical communication system; wherein, the receiver includes the measurement apparatus for residual direct-current components as claim 1.

9. A measurement apparatus for residual direct-current components, applicable to a dual-polarization optical communication system, the measurement apparatus comprising:

a memory that stores a plurality of instructions; and a processor coupled to the memory and configured to execute the instructions to:

measure a sum of power of residual direct-current components in two polarization states;

measure a difference between the power of the residual direct-current components in the two polarization states; and calculate power of a residual direct-current component in each polarization state of an optical transmitter according to the measured sum of power and the measured difference between the power;

and wherein, the processor is configured to execute the instructions to:

select a section of data of a first predetermined length respectively from received signals in the two polarization states;

perform a coordinate transform on two selected sections of data to obtain a group of vectors of Strokes space; and determine the difference between power of the residual direct-current components according to the group of vectors of Strokes space, wherein, performance of the dual-polarization optical communication system is diagnosed or improved in accordance with the calculated power of the residual direct-current component in each polarization state of the optical transmitter.

10. The measurement apparatus according to claim 9, wherein the processor is configured to execute the instructions to:

select the section of data of a second predetermined length respectively from the received signals in the two polarization states;

perform a fast Fourier transform on the selected two sections of data to obtain frequency-domain signals of the two sections of data;

calculate power spectra of the frequency-domain signals of the transformed two sections of data, and add up calculated two power spectra; and find a maximum peak value of an added power spectrum in a frequency offset range, and use power of the maximum peak value as the sum of the power of the residual direct-current components.

11. The measurement apparatus according to claim 10, wherein power Pa of the maximum peak value is expressed as:

$$Pa = P_{XY,N1}(f0);$$

where, X and Y are the received signals in the two polarization states, N1 is the above second predetermined length, and f0 is a frequency at the position of the above maximum peak value.

12. The measurement apparatus according to claim 10, wherein the processor is configured to execute the instructions to:
- select a section of data of a first predetermined length respectively from received signals in the two polarization states;
- perform coordinate transform on the two sections of selected data to obtain a group of vectors of Strokes space; and
- determine a difference between power of the residual direct-current components according to the group of vectors of Strokes space.

13. The measurement apparatus according to claim 9, wherein the second predetermined length is less than a change period of phase noise of the optical communication system, and selection of the second predetermined length ensures that a spectral resolution is within a certain range.

14. The measurement apparatus according to claim 13, wherein the processor is further configured to execute the instructions to:
- perform a down-sampling transform respectively on the two selected sections of data to obtain signals of the data sampled at one multiple of symbol rate, and provide the signals to perform coordinate transform on the signals of the data in two polarization states sampled at one multiple of symbol rate.

15. The measurement apparatus according to claim 13, wherein the group of vectors $\{s(n)\}$ of Strokes space is expressed as:

$$s(n) = \begin{bmatrix} s_1(n) \\ s_2(n) \\ s_3(n) \end{bmatrix} = \begin{bmatrix} |E_X(n)|^2 - |E_Y(n)|^2 \\ 2\mathrm{Re}(E_X^*(n)E_Y(n)) \\ 2\mathrm{Im}(E_X^*(n)E_Y(n)) \end{bmatrix};$$

where, $E_x(n)$ and $E_y(n)$ are two sections of data selected respectively from the received signals in the two polarization states, n is a number from 1 to N2 (the first predetermined length), which is a serial number of data, Re(•) is an operation of taking a real part, and lm(•) is an operation of taking an imaginary part.

16. The measurement apparatus according to claim 13, wherein the processor is further configured to execute the instructions to:
- calculate a unit normal vector of a spatial graph constituted by space points to which the vectors correspond;
- calculate a mean value of projections of the vectors in a normal direction of the unit normal vector; and
- use the mean value as the difference between the power of the residual direct-current components.

17. The measurement apparatus according to claim 16, wherein the mean value is expressed as:

$$Pb = \frac{1}{N2} \sum_{n=1}^{N2} \langle s(n) \cdot \mathrm{Normal} \rangle;$$

where, N2 is the first predetermined length, Normal is the unit normal vector, and s(n) is the group of vectors of Strokes space.

18. The measurement apparatus according to claim 13, wherein the processor is further configured to execute the instructions to:
- calculate a symmetrical central vector of a spatial graph constituted by the space points to which the vectors correspond;
- calculate a modulus value of the symmetrical central vector; and
- use the modulus value as the difference between the power of the residual direct-current components.

19. The measurement apparatus according to claim 18, wherein the symmetrical central vector is expressed as:

$$\mathrm{Center} = \frac{1}{N2} \sum_{n=1}^{N2} s(n);$$

where, N2 is the first predetermined length, and s(n) is the group of vectors of Strokes space.

20. A measurement apparatus for residual direct-current components, applicable to a dual-polarization optical communication system, the measurement apparatus comprising:
- a memory that stores a plurality of instructions; and
- a processor coupled to the memory and configured to execute the instructions to:
  - select a section of data of a first predetermined length respectively from received signals in two polarization states;
  - perform coordinate transform on two selected sections of data to obtain a group of vectors of Strokes space; and
  - determine a difference between power of the residual direct-current components according to the group of vectors of the Strokes space,
- wherein, performance of the dual-polarization optical communication system is diagnosed or improved in accordance with the determined difference between power of the residual direct-current components.

21. A measurement method for residual direct-current components, applicable to a dual-polarization optical communication system, the measurement method comprising:
- selecting a section of data of a first predetermined length respectively from received signals in two polarization states;
- performing a coordinate transform on two selected sections of data to obtain a group of vectors of Strokes space; and
- determining a difference between power of the residual direct-current components according to the group of vectors of the Strokes space,
- wherein, performance of the dual-polarization optical communication system is diagnosed or improved in accordance with the determined difference between power of the residual direct-current components.

22. A non-transitory computer readable storage medium storing a method as in claim 21.

* * * * *